United States Patent
Pilvi et al.

(10) Patent No.: US 11,744,262 B2
(45) Date of Patent: Sep. 5, 2023

(54) METHOD FOR PRODUCING CHOCOLATE COMPOSITION, A CHOCOLATE PRODUCT AND A CHOCOLATE COMPOSITION

(71) Applicant: HELSINKI HEAVEN OY, Vantaa (FI)

(72) Inventors: Taru Pilvi, Vantaa (FI); Selja Paakkunainen, Vantaa (FI); Jukka Peltola, Vantaa (FI); Sampsa Siekkinen, Vantaa (FI); Sami Nupponen, Vantaa (FI)

(73) Assignee: HELSINKI HEAVEN OY, Vantaa (FI)

( * ) Notice: Subject to any disclaimer, the term of this patent is extended or adjusted under 35 U.S.C. 154(b) by 144 days.

(21) Appl. No.: 16/977,085

(22) PCT Filed: Mar. 1, 2019

(86) PCT No.: PCT/FI2019/050165
§ 371 (c)(1),
(2) Date: Aug. 31, 2020

(87) PCT Pub. No.: WO2019/166700
PCT Pub. Date: Sep. 6, 2019

(65) Prior Publication Data
US 2020/0397013 A1    Dec. 24, 2020

(30) Foreign Application Priority Data
Mar. 2, 2018 (FI) ...................... 20185202

(51) Int. Cl.
*A23G 1/48* (2006.01)
*A23G 1/00* (2006.01)
*A23G 1/36* (2006.01)

(52) U.S. Cl.
CPC ............... *A23G 1/48* (2013.01); *A23G 1/002* (2013.01); *A23G 1/005* (2013.01); *A23G 1/36* (2013.01); *A23G 2200/08* (2013.01); *A23G 2200/14* (2013.01)

(58) Field of Classification Search
CPC .......... A23G 1/48; A23G 1/002; A23G 1/005; A23G 1/36

USPC .......................................................... 426/615
See application file for complete search history.

(56) References Cited

U.S. PATENT DOCUMENTS

| | | | | |
|---|---|---|---|---|
| 4,119,740 | A | * | 10/1978 | Crespo .................. A23G 9/322 |
| | | | | 426/631 |
| 4,296,141 | A | | 10/1981 | de Paolis |
| 9,655,374 | B1 | | 5/2017 | Heine |

FOREIGN PATENT DOCUMENTS

| | | | | |
|---|---|---|---|---|
| AU | 2005256151 A1 | * | 12/2006 | ............... A23G 3/48 |
| CN | 109090314 A | | 12/2018 | |
| EP | 1733625 A1 | | 12/2006 | |
| KR | 101303459 B1 | | 9/2013 | |
| RU | 2600604 C1 | | 10/2016 | |
| WO | WO80/02636 | * | 12/1980 | ............... A23G 1/48 |
| WO | 2010117344 A1 | | 10/2010 | |
| WO | WO-2017102522 A1 | * | 6/2017 | ............... A23G 1/48 |
| WO | 2018167788 A1 | | 9/2018 | |

OTHER PUBLICATIONS

International Search Report issued by the Finnish Patent and Registration Office acting as the International Searching Authority in relation to International Application No. PCT/FI2019/050165 dated Sep. 19, 2019 (5 pages).
Written Opinion of the International Searching Authority issued by the Finnish Patent and Registration Office acting as the International Searching Authority in relation to International Application No. PCT/FI2019/050165 dated Sep. 19, 2019 (12 pages).
Anonymous "Coconut Organic & Raw Chocolate", Database Mintel GNPD [online], Sep. 2017 [Retrieved on Sep. 9, 2019] Database accession No. 5088711 whole document.

* cited by examiner

*Primary Examiner* — Jyoti Chawla
(74) *Attorney, Agent, or Firm* — Robert P. Michal, Esq.; Carter, DeLuca & Farrell LLP

(57) ABSTRACT

A method for producing a chocolate composition having dry cocoa solids content of 55% or less by weight. The method includes a first step of providing a first mixture comprising dry non-fat cocoa solids component and plant-based component, a second step of grinding the first mixture and a third step of adding a fat component and a sweetener component to the first mixture for providing the chocolate composition.

9 Claims, 13 Drawing Sheets

200

202 — Fine grinding the first mixture for providing a fine grinded first mixture 204 — Fine grinding the first mixture comprising the coarse grinded dry non-fat cocoa solids component and the plant-based component for proving a fine grinded first mixture 206 — Fine grinding the first mixture comprising the coarse grinded dry non-fat cocoa solids component and the coarse grinded plant-based component for proving the fine grinded first mixture 208 — Fine grinding the coarse grinded first mixture comprising the coarse grinded dry non-fat cocoa solids component and the coarse grinded plant-based component for proving the fine grinded first mixture

METHOD FOR PRODUCING CHOCOLATE COMPOSITION, A CHOCOLATE PRODUCT AND A CHOCOLATE COMPOSITION

CROSS-REFERENCE TO RELATED APPLICATIONS

This application is a national phase entry under 35 U.S.C. 371 of PCT International Application No. PCT/FI2019/050165 filed Mar. 1, 2019, which claims priority to Finnish Patent Application No. 20185202, filed Mar. 2, 2018, the disclosure of each of these applications is expressly incorporated herein by reference in their entirety.

FIELD OF THE INVENTION

The present invention relates to a method for producing a chocolate composition having dry cocoa solids content of 55% or less by weight.

The present invention further relates to a chocolate product.

The present invention further relates to a chocolate composition containing dry cocoa solids content 55% or less by weight.

BACKGROUND OF THE INVENTION

Many kinds of chocolates are known in the art and conventional chocolates are roughly categorized into milk chocolates, dark chocolates and white chocolates. Milk chocolate is a solid chocolate made with milk having a minimum of 25% cocoa solids specified by EU regulations. Dark chocolate is produced using high cocoa mass content, usually from 57 to 80% by weight, and traditionally dark chocolate is made with cocoa butter instead of milk, but dark milk chocolates are also known. White chocolate is typically made of sugar, milk, and cocoa butter, without the cocoa solids. High sugar content is typical for conventional chocolates and especially those that are categorized as milk chocolates or white chocolates. Dark chocolates typically comprise sugar 30-40% whereas milk chocolates or white chocolates may contain sugar over 40% and even 50%.

Directive 2000/36/EC of the European Parliament and of the Council of 23 Jun. 2000 relating to cocoa and chocolate products intended for human consumption defines chocolate as designating the product obtained from cocoa products and sugars which contains not less than 35% total dry cocoa solids, including not less than 18% cocoa butter and not less than 14% of dry non-fat cocoa solids.

In recent years, raw chocolates have become more and more popular in the field of chocolates. A fundamental difference between a raw chocolate and a conventional chocolate is that the cocoa beans are not heated above 42° C. and the rest of the production process is carried in a temperature which is less than 45° C. In conventional chocolate products, the cocoa beans are usually roasted such that the temperature rises above 100° C. Another difference is that raw chocolates typically contain only cocoa content, sweetener and possible fruits or seeds whereas conventional chocolates contain also milk solids or soya solids, non-cocoa fats, sugars and possible flavourings. As raw chocolates do not contain milk, they are typically quite dark.

Still another difference between raw chocolates and conventional chocolates relates to the term for cocoa. *Theobroma Cacao* is an evergreen tropical tree, which grows edible seeds called cocoa beans. The cocoa beans are inside cocoa pods which are cracked open to release cocoa beans. After releasing cocoa beans, they can be processed different ways. The cocoa beans are fermented and dried before they are further processed. When the cocoa beans are fermented naturally without artificial heating and preferably such that the temperature does not rise above 45° C. the term cacao is used and chocolate that is made from the cacao and such that the temperature does not rise above 45° C., and preferably even 42° C., is called raw chocolate. Otherwise the term cocoa is used to refer to the heated form of cacao. Cacao butter is the fatty part of the cacao bean that is removed from the cacao bean during production. Cacao nibs are cacao beans that have been chopped up into smaller pieces. One of the problems associated with the prior art is that when producing raw chocolate which is suitable for vegans, i.e. producing vegan raw chocolate, and which is also a milk-chocolate-type chocolate, i.e. chocolate that is not dark, a proper chocolate composition is difficult to produce because of the good fluidity properties the chocolate composition should have. Another problem with the prior art is that the conventional chocolate compositions comprise a lot of sugars such that the sugar content is at least one third of the total content of the chocolate.

BRIEF DESCRIPTION OF THE INVENTION

An object of the present invention is to provide method for producing chocolate composition, a chocolate product and a chocolate composition which alleviate the disadvantages associated with prior art.

The objects of the invention are achieved by a method for producing chocolate composition, a chocolate product and a chocolate composition which are characterized by what is stated in the independent claims. The preferred embodiments of the invention are disclosed in the dependent claims.

The invention is based on the idea of providing an efficient method for producing chocolate and providing a chocolate composition having a reduced sugar content.

In this application, the term cocoa is used for both cocoa and cacao, meaning that even if raw chocolate is referred the term cocoa is used instead of cacao. In other words, cocoa means in the context of the invention described in this application both cocoa and cacao.

The invention relates to method for producing chocolate composition, a chocolate product and a chocolate composition. In a most advantageous embodiment of the invention the method for producing chocolate composition, a chocolate product and a chocolate composition is related to raw chocolate, especially to vegan raw chocolate which is a milk chocolate type vegan raw chocolate.

According to the invention the method for producing chocolate composition having dry cocoa solids content of 55% or less by weight comprises a first step of providing a first mixture comprising dry non-fat cocoa solids component and plant-based component; a second step of grinding the first mixture; and a third step of adding a fat component and a sweetener component to the first mixture for providing the chocolate composition.

In an embodiment of the invention the first step comprises coarse grinding the dry non-fat cocoa solids component and providing the first mixture comprising the coarse grinded dry non-fat cocoa solids component and the plant-based component; or alternatively coarse grinding the dry non-fat cocoa solids component, coarse grinding the plant-based component and providing the first mixture comprising the coarse grinded dry non-fat cocoa solids component and the coarse grinded plant-based component; or alternatively providing the first mixture comprising dry non-fat cocoa solids component and plant-based component and coarse grinding the first mixture such that the dry non-fat cocoa solids component and plant-based component are coarse grinded together for providing a coarse grinded first mixture comprising the coarse grinded dry non-fat cocoa solids component and the coarse grinded plant-based component.

In an embodiment of the invention the second step comprises fine grinding the first mixture for providing a fine grinded first mixture; or alternatively fine grinding the first mixture comprising the coarse grinded dry non-fat cocoa solids component and the plant-based component for providing the fine grinded first mixture; or alternatively fine grinding the first mixture comprising the coarse grinded dry non-fat cocoa solids component and the coarse grinded plant-based component for providing the fine grinded first mixture; or alternatively fine grinding the coarse grinded first mixture comprising the coarse grinded dry non-fat cocoa solids component and the coarse grinded plant-based component for providing the fine grinded first mixture.

In an embodiment of the invention the third step comprises adding the fat component to the first mixture for providing a second mixture comprising the dry non-fat cocoa solids component, plant-based component and the fat component; or alternatively adding the fat component to the first mixture during the fine grinding of the first mixture in the second step for providing a second mixture comprising the dry non-fat cocoa solids component, plant-based component and the fat component; or alternatively adding the fat component to the first mixture after coarse grinding the cocoa solids component and/or the plant-based component for providing a second mixture comprising the dry non-fat cocoa solids component, plant-based component and the fat component.

In an embodiment of the invention the third step comprises adding the sweetener component to the second mixture for providing the chocolate composition; or alternatively fine grinding the second mixture for providing a grinded second mixture and adding the sweetener component to the grinded second mixture for providing the chocolate composition; or alternatively fine grinding the second mixture for providing a grinded second mixture, adding the sweetener component to the grinded second mixture for providing the chocolate composition and fine grinding the chocolate composition; or alternatively fine grinding the second mixture, adding the sweetener component to the second mixture in two or more batches for providing the chocolate composition, fine grinding the second mixture between adding the two or more batches of the sweetener component and fine grinding the chocolate composition.

In an embodiment of the invention the method comprises providing the first mixture comprising the dry non-fat cocoa solids component and the plant-based component; coarse grinding the first mixture for providing the coarse grinded first mixture; fine grinding the coarse grinded first mixture; adding the fat component to the first mixture during the fine grinding of the first mixture for providing the second mixture; fine grinding the second mixture; adding sweetener component to the second mixture in two or more batches for providing the chocolate composition; fine grinding the second mixture between the two or more batches of the sweetener component; and fine grinding the chocolate composition.

In an embodiment of the invention the method comprises filtering the chocolate composition; or alternatively filtering the chocolate composition and tempering the chocolate composition.

In an embodiment of the invention temperature of the dry non-fat cocoa solids component, plant-based component, the fat component and the sweetener component does not exceed 45° C. during the method; or alternatively temperature of the dry non-fat cocoa solids component, plant-based component, the fat component and the sweetener component does not exceed 42° C. during the method.

In an embodiment of the invention the dry non-fat cocoa solids component comprises cocoa beans and/or cocoa nibs; or alternatively the dry non-fat cocoa solids component comprises cocoa beans and/or cocoa nibs and the fat component comprises cocoa butter; or alternatively the dry non-fat cocoa solids component comprises cocoa beans and/or cocoa nibs, the fat component comprises cocoa butter, and the sweetener component comprises coconut palm sugar; or alternatively the dry non-fat cocoa solids component comprises cocoa beans and/or cocoa nibs, the fat component comprises cocoa butter and the plant-based component comprises oat or alternatively the dry non-fat cocoa solids component comprises cocoa beans and/or cocoa nibs, the fat component comprises cocoa butter, the plant-based component comprises oat and the sweetener component comprises coconut palm sugar.

According to the invention a chocolate product containing dry cocoa solids content of 55% or less by weight is produced by a method according to any one of claims 1 to 9.

In an embodiment of the invention the chocolate product comprises a dry non-fat cocoa solids component, a plant-based component, a fat component and a sweetener component, the plant-based component forming 18-25 w-% of the chocolate product and the sweetener component forming 20-40 w-% of the chocolate product.

In an embodiment of the invention the sweetener component forming 20-32 w-% of the chocolate product.

According to the invention a chocolate composition containing dry cocoa solids content 55% or less by weight comprises a dry non-fat cocoa solids component, a plant-based component, a fat component and a sweetener component, the plant-based component forming 18-25 w-% of the chocolate composition and the sweetener component forming 20-40 w-% of the chocolate composition.

In an embodiment of the invention the sweetener component forming 20-32 w-% of the chocolate composition.

In an embodiment of the invention the dry cocoa solids content comprising the dry non-fat cocoa solids component, and a cocoa butter forming at least part of the fat component.

In an embodiment of the invention the plant-based component is an oats component, said oats component may be provided in a form of oat flakes, oat meal, oat bran, oat groats, oat powder or oat grains.

In an embodiment of the invention the fat component comprises cocoa butter and the sweetener component comprises at least one of the following: coconut palm sugar, stevia, cane sugar, xylitol, syrup, maple sugar, palm sugar, coconut sugar In an embodiment of the invention the dry non-fat cocoa solids component and the cocoa butter together forming 25-55 w-% of the chocolate composition; or alternatively the dry non-fat cocoa solids component and the cocoa butter together forming 35-55 w-% of the chocolate composition; or alternatively the dry non-fat cocoa solids component and the cocoa butter together forming 40-55 w-% of the chocolate composition; or alternatively the dry non-fat cocoa solids component and the cocoa butter together forming 45-55 w-% of the chocolate composition.

In an embodiment of the invention the plant-based component or an oat component forming 20-24 w-% of the chocolate composition; or alternatively the plant-based component or an oat component forming 20-24 w-% of the chocolate composition and the sweetener component forming 25-30 w-% of the chocolate composition.

In an embodiment of the invention the chocolate composition comprising 50-55 w-% of dry non-fat cocoa solids component and cocoa butter, 18-25 w-% of the oats component and 20-32 w-% of the sweetener component.

According to the invention the dry non-fat cocoa solids component is cocoa beans or cocoa nibs or mixture of cocoa beans and cocoa nibs.

According to the invention the plant-based component is most preferably oats, or any one of the following: rice, wheat, barley, rye, corn, spelts, quinoa, sesame seeds, sunflower seeds, hemp seeds, pumpkin seeds or vegetables. Said plant-based component is in a form of flakes, seeds, coarse particles, meal, bran, groats, powder or grains.

In the context of this application, the plant-based component means non-cocoa component of the chocolate composition.

Further, in the context of this application, the plant-based component means non-sweetener component or non-sugar component. The plant-based component also means non-fat component of the chocolate composition.

In other words, the plant-based component means non-cacao component, non-fat component and non-sweetener component of the chocolate composition.

According to the invention the fat component is cocoa butter.

According to the invention the sweetener component is preferably coconut palm sugar, palm sugar, yacon syrup, stevia, honey, dates or date syrup, rapadura, carob, lacuma, fruit juice, xylitol, erythritol, agave nectar or any other sweetener that is categorized as a raw sweetener. It should be understood, that there might be sweeteners that are the same as listed here above but which are processed such that they are not categorized as raw sweeteners. Alternatively, the sweetener component may be: other sugars, such as sucrose, dextrose, glucose syrup solids, fructose; sugar alcohols, such as sorbitol, mannitol, isomalt; intense sweeteners, such as saccharin, aspartamene; or any combination of sugars, sugar alcohols and intense sweeteners.

According to the invention and in the most advantageous embodiment of the invention there is no emulsifier used in the method for producing chocolate composition, in the chocolate product and in the chocolate composition. In other words, the chocolate composition is emulsifier free meaning that a separate emulsifier component is not used in the chocolate composition or in the method for producing chocolate composition. In still other words, the chocolate composition is free of a separate emulsifier component. In still other words, the chocolate composition has no additional emulsifier, i.e. the chocolate composition is additional lecithin free chocolate composition.

Oat is the most preferable plant-based component in the context of this invention as it comprises naturally lecithin so that need for additional lecithin or emulsifier is reduced or eliminated.

When the chocolate composition is produced, especially when using cacao, meaning non-roasted cocoa beans, the chocolate composition or the chocolate product becomes easily bitter in taste. Thus, large amounts of sweetener are used for making the chocolate composition or chocolate product less bitter in taste. Furthermore, the fluidity of the chocolate composition is an important characteristic, as it directly affects the production process of the chocolate. Sweeteners and emulsifiers are conventionally used for increasing the fluidity of the chocolate composition.

In the present invention, use of oat as the plant-based component has surprisingly enabled using considerably less sweetener component, or sugar component, in the chocolate composition without making the chocolate composition too bitter in taste. Further, no additional emulsifier, such as lecithin, needs to be added to the chocolate composition even as there is decreased amount of sweetener component, or sugar component, in the chocolate composition. This may be achieved due to the method in which the first mixture is first grinded and then fat component and sweetener component are added. This may be also achieved due to the ratio of components and use oat in the chocolate composition, according to the present invention.

An advantage of the invention is that a chocolate composition that comprises less than 55 w-% cocoa meaning that the chocolate is not a dark chocolate and still the sweetener component of the chocolate composition is 32 w-% or less. Furthermore, the method and chocolate composition of the present invention enables achieving chocolate composition with good fluidity characteristics without high amount of the sweetener component.

BRIEF DESCRIPTION OF THE DRAWINGS

The invention is described in detail by means of specific embodiments with reference to the enclosed drawings, in which

FIG. 5 shows an embodiment of the second step of the method according to the invention;

DETAILED DESCRIPTION OF THE INVENTION

The present invention relates to a method for producing chocolate composition having dry cocoa solids content of 55% or less in weight. The dry cocoa solids content comprises dry non-fat cocoa solids component and cocoa butter. The dry non-fat cocoa solids component may comprise cocoa beans, cocoa nibs, cocoa powder or the like dry non-fat cocoa solids components. The cocoa butter is obtained from the cocoa beans by extraction, for example by pressing or cold pressing cocoa beans or cocoa nibs. The cocoa nib is the centre of the cocoa bean, meaning that the cocoa nib is obtained by peeling a cocoa bean or removing skin of the cocoa bean.

The present invention further relates to a chocolate product produced by the method of the present invention.

The present invention also relates to a chocolate composition containing dry cocoa solids content of 55% or less in weight.

Figure 1:
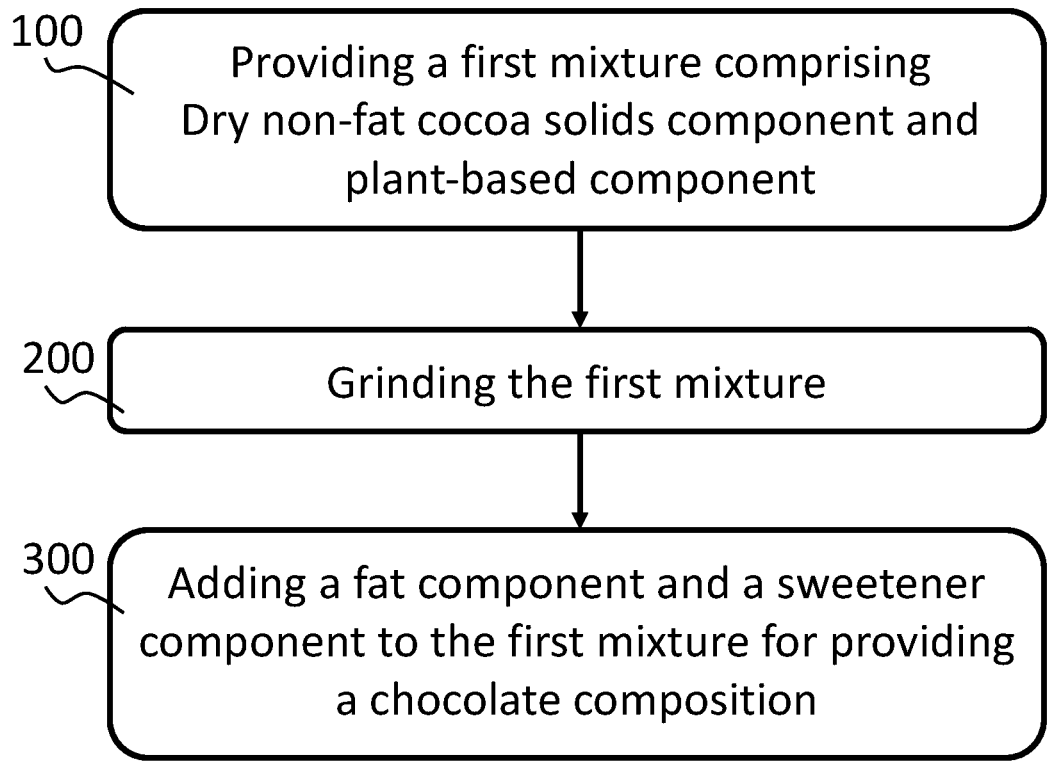
FIG. 1 shows a basic diagram of the method according to the invention.

FIG. 1 shows a basic diagram of the method according to the present invention. The method for producing the chocolate composition comprises a first step 100 of providing a first mixture comprising dry non-fat cocoa solids component and plant-based component. The method further comprises a second step 200 of fine grinding the first mixture and a third step 300 of adding a fat component and a sweetener component to the first mixture for providing the chocolate composition.

According to the above mentioned, the method of the present invention is based on first grinding the dry non-fat cocoa solids component and the plant-based component which are grinded together. After that, the fat component and the sweetener component are added to the first mixture. Accordingly, in the present invention the dry non-fat cocoa solids component and the plant-based component are grinded together, at least some time or a predetermined time, before the fat component and the sweetener component are added.

The fat component and the sweetener component may be grinded with first mixture for providing the chocolate composition.

In context of the present application grinding of the components forming the chocolate composition may be carried out in one grinding step or in two grinding steps. Coarse grinding step or pre-grinding may be carried out only for the dry non-fat cocoa solids component and/or the plant-based component. In the coarse grinding step, the dry non-fat cocoa solids component and/or the plant-based component are grinded in coarse grinding means to a desired particle size such that they may be utilized in or subjected to fine grinding step in which the chocolate composition is produced. In the fine grinding step, or chocolate composition grinding step, dry non-fat cocoa solids component, the plant-based component, the fat component and the sweetener component are grinded together in fine grinding means for producing the chocolate composition. In the fine grinding step components or the chocolate composition are grinded to particles which may be less 100 μm.

According to the method of the invention, at least one grinding step is performed in a ball mill, especially when the plant-based component is an oat component. In prior art methods for producing a chocolate composition comprising for example coconut, the coconut is grinded in a stone mill and provided to the chocolate composition in a form of manna.

In the following the first step 100 of providing the first mixture is described showing different embodiments and referring to the figures. It should be noted, that mixing the dry non-fat cocoa solids component and the plant-based component means that they are arranged together in a vessel, chamber or container. They may further be mixed, or the actual mixing may be omitted, or the mixing may take place during grinding. Therefore, mixing does not necessary mean in this context that the first mixture is provided as homogenous mixture. However, the first mixture may also be substantially homogenous mixture.

In the method of the present invention the first mixture is first grinded such that the dry non-fat cocoa solids component and the plant-based component is first grinded together before the fat component and the sweetener component are added to the first mixture. The first mixture may be fine grinded, coarse grinded or fine and coarse grinded before adding the fat component and the sweetener component to the first mixture.

In one embodiment, as shown in FIG. 1, the first step 100 comprises mixing the dry non-fat cocoa solids component and plant-based component together for providing the first mixture. In this embodiment, the dry non-fat cocoa solids component and plant-based component may be powder materials or they may have small particle size. Then the first mixture is fine grinded in fine grinding means in the second step 200, or in fine grinding step 202 as shown in FIG. 5, for providing fine grinded first mixture. Accordingly, in this embodiment the dry non-fat cocoa solids component and the plant-based component are fine grinded together, at least a predetermined time, for forming fine grinded first composition.

The fat component may be added in the third step 300 to the fine grinded first mixture during, or after, the fine grinding. Alternatively, the fat component and the sweetener component may be added in the third step 300 to the fine grinded first mixture during or after the fine grinding. Accordingly, the dry non-fat cocoa solids component and the plant-based component are fine grinded together in step 202 before adding the fat component or the fat component and the sweetener component. The fine grinding may be continued during and/or after the adding of the fat component and the sweetener component in third step 300. Thus, the chocolate composition may fine grinded until the particle size and characteristics of the chocolate composition are desired.

In one embodiment the fat component is added before the sweetener component. In another embodiment, the fat component and the sweetener component are added at least partly simultaneously. In a yet alternative embodiment, the sweetener component is added before the fat component.

Figure 2:
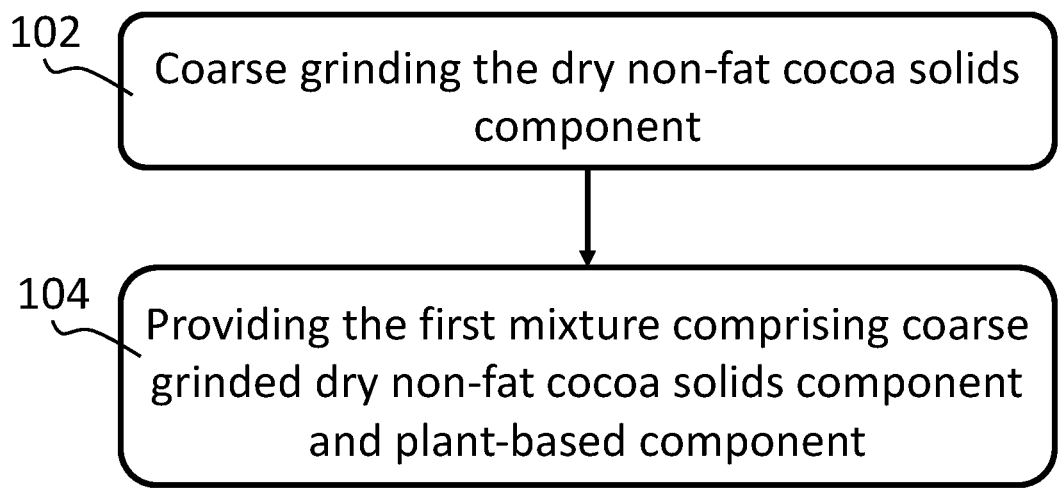
FIG. 2 shows an embodiment of the first step of the method according to the invention.

FIG. 2 discloses another embodiment for providing the first mixture comprising the dry non-fat cocoa solids component and the plant-based component. The dry non-fat cocoa solids component may comprise cocoa beans, cocoa nibs or parts or mixture thereof. Thus, the dry non-fat cocoa solids component may have coarse or large particle size. In this embodiment, the dry non-fat cocoa solids component is first coarse grinded in step 102. Then, the first mixture may be provided from the coarse grinded dry non-fat cocoa solids component and the plant-based component. The coarse grinded dry non-fat cocoa solids component and the plant-based component may be mixed together for providing the first mixture in step 104. In this case, the plant-based component may be in powder form or have such a small particle size that coarse grinding is not necessary for the plant-based component.

Then, the first mixture comprising coarse grinded dry non-fat cocoa solids component and the plant-based component is fine grinded at least a predetermined time, for forming fine grinded first mixture, as disclosed in step 204 of FIG. 5.

When the first mixture has been fine grinded, at least some time, the fat component may be added in the third step 300 to the fine grinded first mixture during or after the fine grinding. Alternatively, the fat component and the sweetener component may be added in the third step 300 to the fine grinded first mixture during or after the fine grinding. The fine grinding may be continued during and/or after the adding of the fat component and the sweetener component in third step 300.

Figure 3:
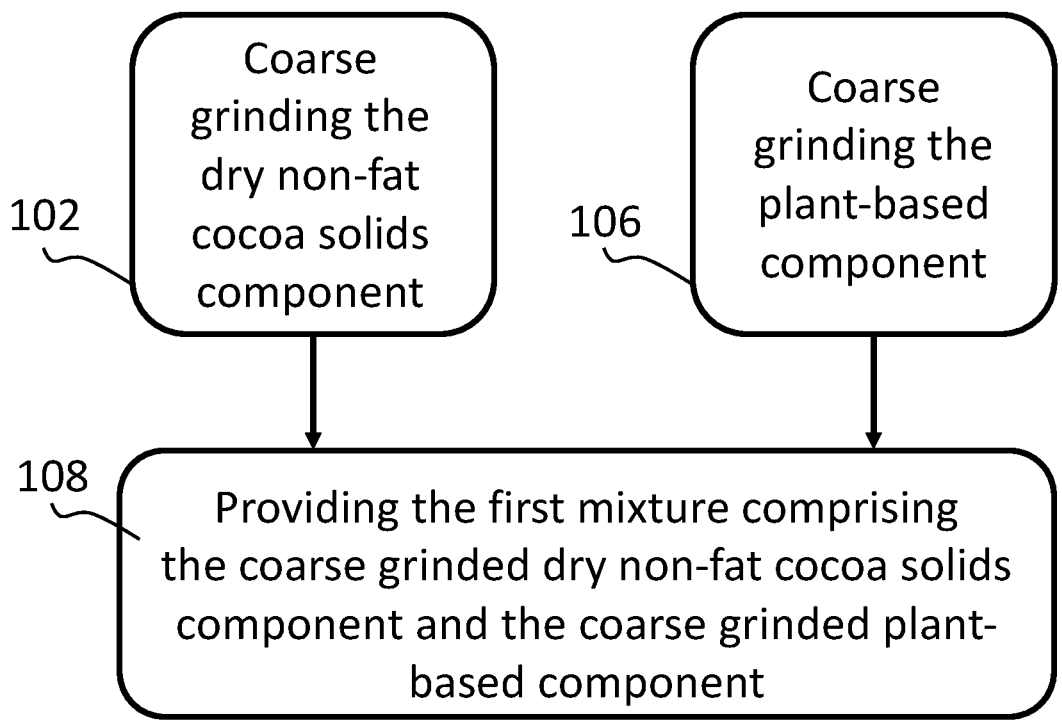
FIG. 3 shows another embodiment of the first step of the method according to the invention.

FIG. 3 discloses another embodiment of the first step 100 of providing the first mixture comprising the dry non-fat cocoa solids component and the plant-based component. The dry non-fat cocoa solids component may comprise cocoa beans, cocoa nibs or parts or mixture thereof. Thus, the dry non-fat cocoa solids component may have coarse or large particle size. Similarly, the plant-based component may comprise seeds, flakes or the like particles having coarse or large particle size. In this embodiment, the dry non-fat cocoa solids component is coarse grinded in step 102. Further, the plant-based component is also coarse grinded in step 106. The dry non-fat cocoa solids component and the plant-based component are coarse grinded separately from the each other.

Then, the first mixture may be provided from the coarse grinded dry non-fat cocoa solids component and the coarse grinded plant-based component. The coarse grinded dry non-fat cocoa solids component and the coarse grinded plant-based component may be mixed together for providing the first mixture in step 108.

Then, the first mixture comprising coarse grinded dry non-fat cocoa solids component and the coarse grinded plant-based component is fine grinded at least a predetermined time, for forming fine grinded first composition, as disclosed in step 206 of FIG. 5.

When the first mixture has been fine grinded, at least some time, the fat component may be added in the third step 300 to the fine grinded first mixture during or after the fine grinding. Alternatively, the fat component and the sweetener component may be added in the third step 300 to the fine grinded first mixture during or after the fine grinding. The fine grinding may be continued during and/or after the adding of the fat component and the sweetener component in third step 300.

Furthermore, it should be noted that the embodiments of FIGS. 2 and 3 may also be combined and modified for providing an embodiment comprising step 106 of coarse grinding the plant-based component. The dry non-fat cocoa solids component may be in power form or have such a small particles size that the coarse grinding step 102 may be omitted. Therefore, the first mixture may be provided from the dry non-fat cocoa solids component and the coarse grinded plant-based component. The dry non-fat cocoa solids component and the coarse grinded plant-based component may be mixed together for providing the first mixture. Then, the first mixture comprising dry non-fat cocoa solids component and the coarse grinded plant-based component are fine grinded together at least a predetermined time, for forming fine grinded first composition.

Figure 4:
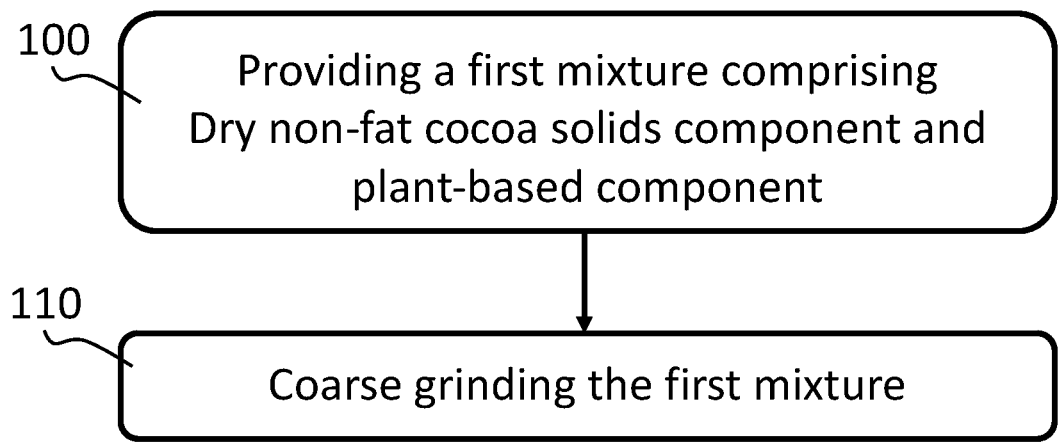
FIG. 4 shows yet another embodiment of the first step of the method according to the invention.

FIG. 4 discloses yet an alternative embodiment of the step 100 for providing the first mixture in step 100. In this embodiment, dry non-fat cocoa solids component and the plant-based component are first arranged together for forming the first mixture. The dry non-fat cocoa solids component may comprise cocoa beans, cocoa nibs or parts or mixture thereof. Thus, the dry non-fat cocoa solids component may have coarse or large particle size. Similarly, the plant-based component may comprise seeds, flakes or the like particles having coarse or large particle size.

Then the first mixture comprising dry non-fat cocoa solids component and the plant-based component are coarse grinded in step 110 such that the dry non-fat cocoa solids component and plant-based component are coarse grinded together for providing a coarse grinded first mixture comprising the coarse grinded dry non-fat cocoa solids component and the coarse grinded plant-based component coarse grinded together.

The mixing of the dry non-fat cocoa solids component and the plant-based component may be carried out in the coarse grinding means before or upon the coarse grinding the first mixture.

Further, the coarse grinded first mixture may be subjected to fine grinding after the coarse grinding step 110, as disclosed in step 208 of FIG. 5. The fat component or the fat component and the sweetener component may be added to the coarse grinded first mixture after the coarse grinding step 110. Accordingly, the fat component or the fat component and the sweetener component may be added to the coarse grinded first mixture after the coarse grinding step 110 and before the subsequent fine grinding step 208. Alternatively, the fat component may be added to the coarse grinded first mixture after the coarse grinding step 110 and before the subsequent fine grinding step 208, and the sweetener component may be added during the fine grinding step 208. Yet alternatively, the fat component and the sweetener component may be added to the coarse grinded first mixture after the coarse grinding step 110 and during the subsequent fine grinding step 208. The fine grinding may be continued during and/or after the adding of the fat component and the sweetener component in third step 300.

Furthermore, it should be noted that the fat component or the fat component and the sweetener component, or at least part of the fat component or the sweetener component, may be added to the first mixture also during the coarse grinding to the first mixture.

After providing the first mixture and providing coarse grinded first mixture or fine grinding the first mixture, fat component and sweetener component may be added in the step 300. In step 300 the first mixture is a grinded first mixture. This means that the first mixture is either coarse grinded or fine grinded before the fat component or the fat component and the sweetener component are added to the first mixture. The first mixture may also be coarse grinded and fine grinded, at least some time, before the fat component or the fat component and the sweetener component are added to the first mixture. Thus, the first mixture in step 300 is always coarse grinded first mixture or fine grinded first mixture.

According to the above mentioned, the step 300 may be carried out during the coarse grinding of the first mixture, after the coarse grinding of the first mixture and before the fine grinding of the first mixture, or during the fine grinding of the first mixture. Furthermore, the fat component may be added to the first mixture during the coarse grinding of the first mixture, after the coarse grinding of the first mixture and before the fine grinding of the first mixture, or during the fine grinding of the first mixture for forming a second mixture. Additionally, the sweetener component may be added to the first mixture during the coarse grinding of the first mixture, after the coarse grinding of the first mixture and before the fine grinding of the first mixture, or during the fine grinding of the first mixture for forming a second mixture, as separately from adding the fat component. Accordingly, all separate combinations of the adding the fat component and the sweetener component may be utilized.

In preferred embodiments, the sweetener component is added to the second mixture, meaning that the sweetener component is added after the fat component.

Figure 6:
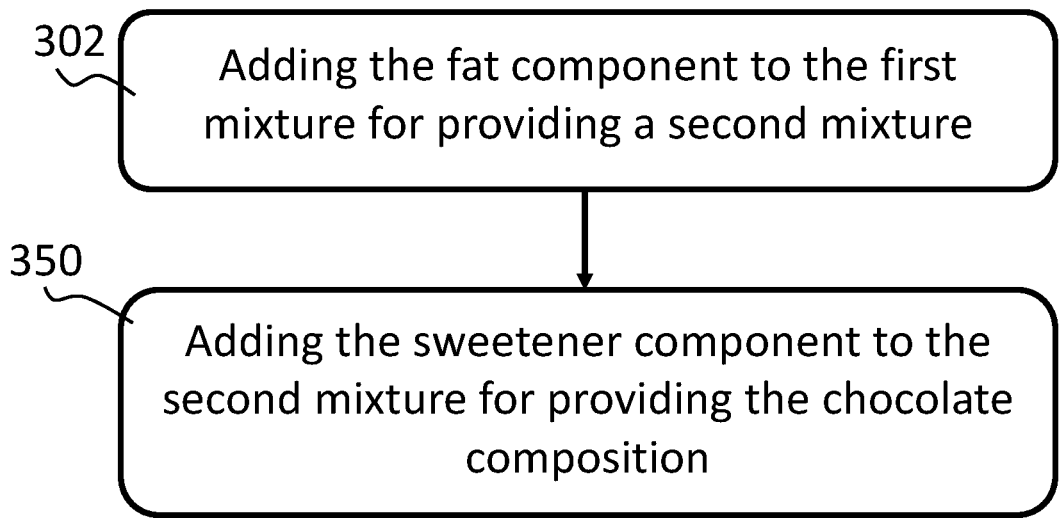
FIG. 6 shows an embodiment of the third step of the method according to the invention.

FIG. 6 discloses one embodiment of the step 300. In this embodiment, the fat component is added to the grinded first mixture in step 302 for forming a second mixture comprising the dry non-fat cocoa solids component, plant-based component and the fat component. Then, the sweetener component is added to the second mixture for providing the chocolate composition in step 350. Thus, the sweetener component is added after the fat component.

Figure 7:
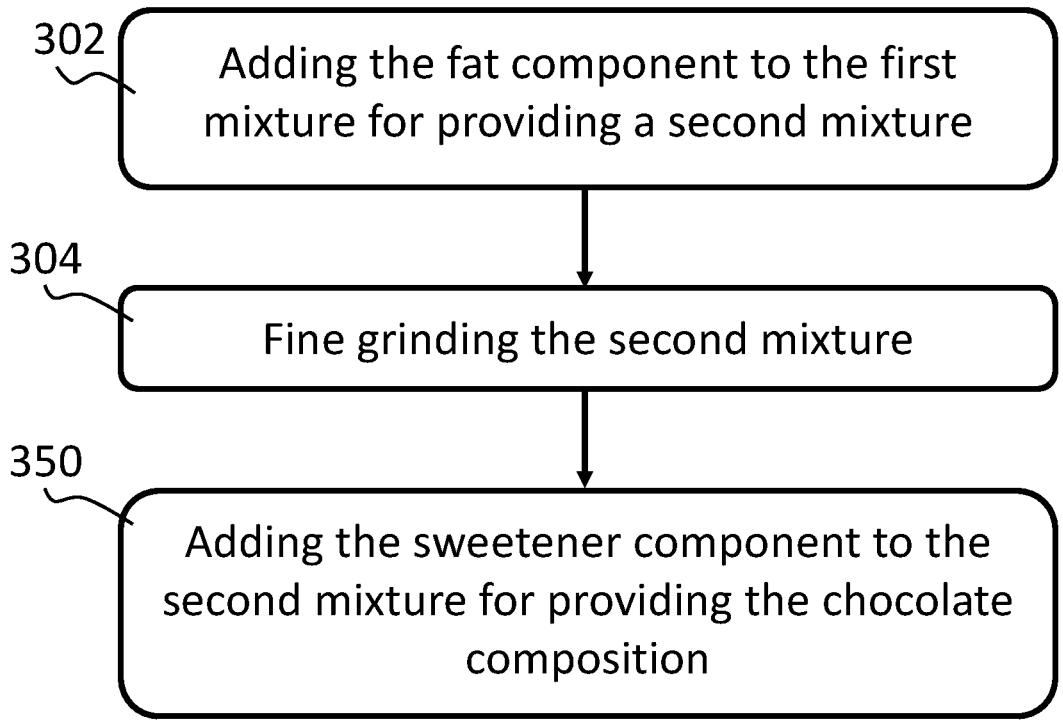
FIG. 7 shows another embodiment of the third step of the method according to the invention.

FIG. 7 discloses an alternative embodiment, in which the fat component is added to the grinded first mixture in step 302 for forming a second mixture comprising the dry non-fat cocoa solids component, plant-based component and the fat component. Then, the second mixture is fine grinded in step 304. The sweetener component is added to the fine grinded second mixture for providing the chocolate composition in step 350 after fine grinding the second mixture, at least some time.

The embodiment of FIG. 7, may be carried out such that the fat component is added to the first mixture during coarse grinding of the first mixture and the sweetener component during the coarse grinding, after the coarse grinding or during the fine grinding.

The embodiment of FIG. 7, may also be carried out such that the fat component is added to the first mixture after coarse grinding of the first mixture and the sweetener component after the coarse grinding or during the fine grinding.

The embodiment of FIG. 7, may further be carried out such that the fat component is added to the first mixture during fine grinding of the first mixture and the sweetener component during the fine grinding.

In a special case, both the fat component and the sweetener component may be added during the coarse grinding such that the step 304 in FIG. 7 is replaced by step of coarse grinding the second mixture.

Figure 8:
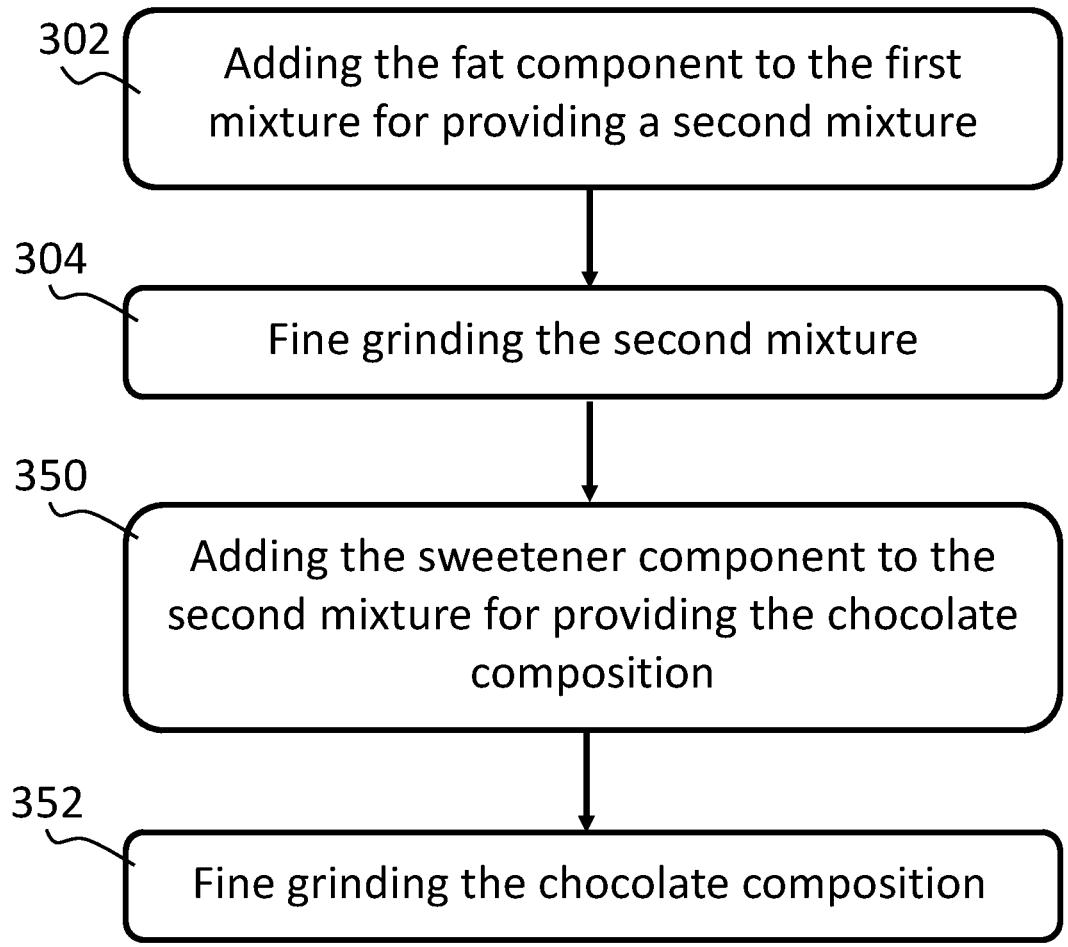
FIG. 8 shows still another embodiment of the third step of the method according to the invention.

FIG. 8 discloses continuation to FIG. 7. After adding the sweetener component to the second mixture in step 350, the formed chocolate composition is further fine grinded in step 352 in order to provide the chocolate composition with desired characteristics. These, characteristics may comprise desired particles size of the components or fluidity of the chocolate composition.

Figure 9:
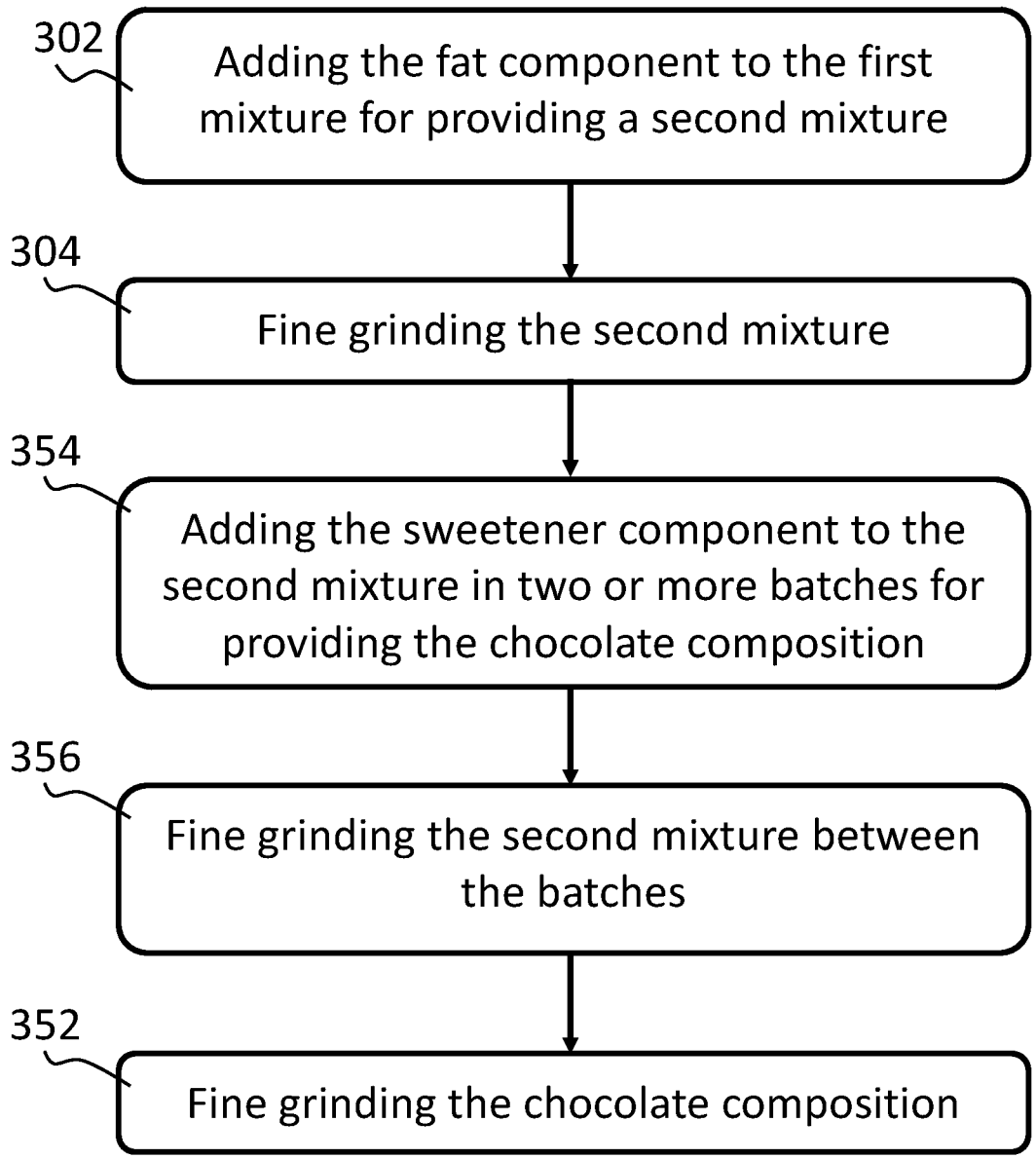
FIG. 9 shows yet another embodiment of the third step of the method according to the invention.

FIG. 9 shows one embodiment for adding the sweetener component to the second mixture. In this embodiment, the sweetener component is added to the second mixture in two or more batches in step 354, as shown in FIG. 9. The second mixture is further fine grinded between the adding the batches of the sweetener component in step 356. Then the formed chocolate composition is further fine grinded in step 352, after adding the sweetener component. Accordingly, the sweetener component is added to the second mixture in two or more separate parts or batches, meaning that the sweetener component is not added to the second mixture in one go. After all the batches of the sweetener component are added to the second mixture the chocolate composition is formed and the chocolate composition is further fine grinded in step 352 for obtaining desired properties or characteristics to the chocolate composition.

As mentioned above, the steps 302, 304, 354, and 356 may also be carried out during coarse grinding the first mixture and only the chocolate composition may be subjected to fine grinding. Alternatively, the steps 302 and 304 may be carried out during coarse grinding the first mixture and the steps 354 and 356 after the coarse grinding the first mixture or during the fine grinding of the second mixture. Yet alternatively, the steps 302 and 304 may be carried out after coarse grinding the first mixture and the steps 354 and 356 during the fine grinding of the second mixture. Adding the sweetener component in two or more separate batches to the second mixture always comprises grinding the second mixture between adding the separate batches of the sweetener component.

It should be noted that the fat component may be preferably added to the first mixture in one batch or one go, or it may also be added in separate batches. Also, in some embodiments, the sweetener component may be added in one batch or one go.

Figure 10:
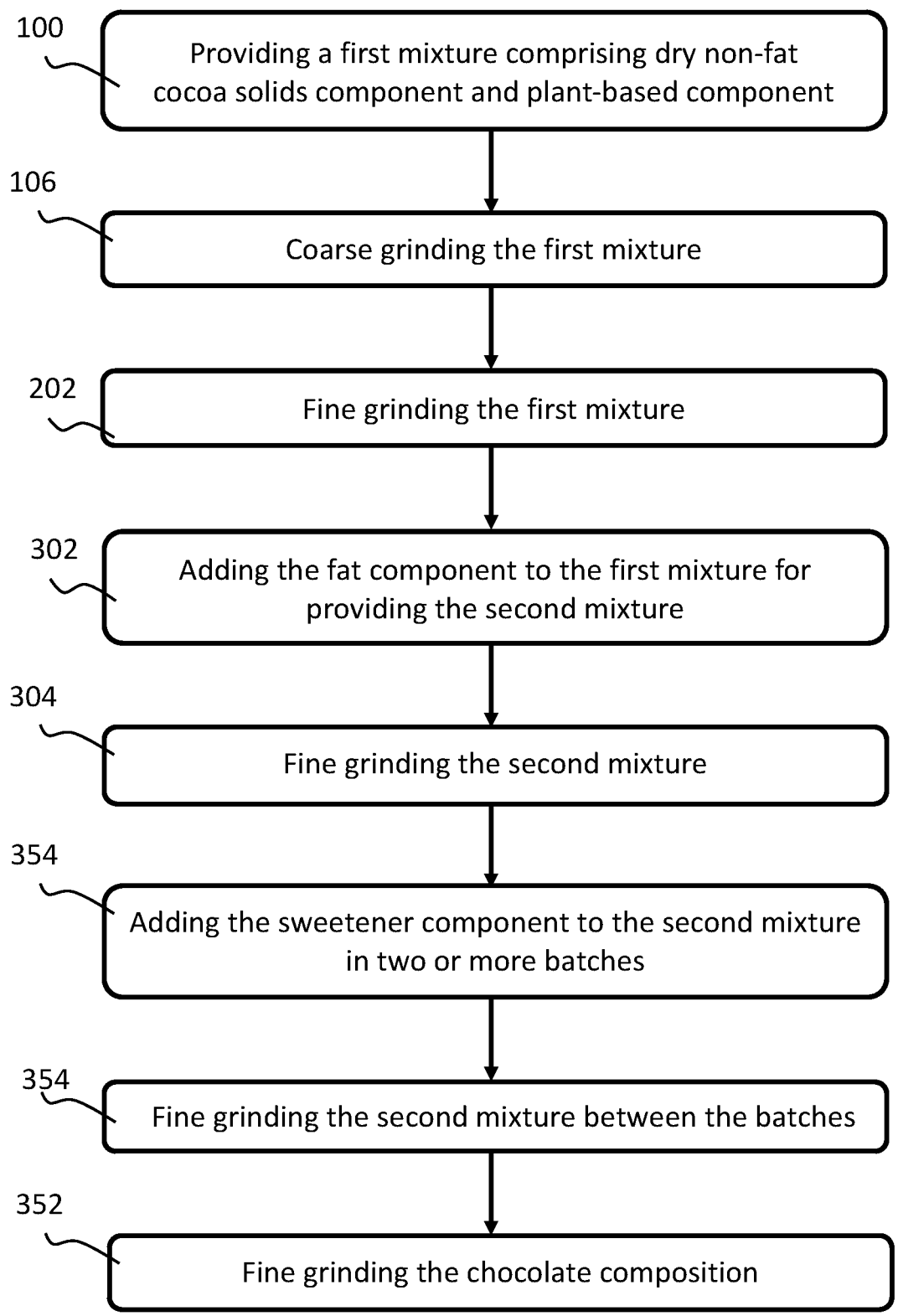
FIG. 10 shows an embodiment of the method according to the invention.

FIG. 10 shows one example of the method according to the present invention. This embodiment comprises providing in step 100 the first mixture comprising the dry non-fat cocoa solids component and the plant-based component and coarse grinding the first mixture in step 106 for providing the coarse grinded first mixture. Then the coarse grinded first mixture is fine grinded, at least some time, in step 202. The fat component is added to the first mixture 302 during the fine grinding of the first mixture for providing the second mixture 302 and the second mixture 304 is fine grinded, at least some time. Then the sweetener component is added to the second mixture 354 in two or more batches for providing the chocolate composition, and the second mixture is fine grinded between the two or more batches of the sweetener component 356. After the sweetener component is added the chocolate composition is formed and the chocolate composition 352 is further fine grinded until desired characteristics are achieved.

The fine grinding of the chocolate composition in step 352 is continued until the average particle diameter of the components in the chocolate composition is less than 120 μm, or less than 100 m, or between 20-120 sm. Preferably, the average particle size of the components in the chocolate composition is between 60-120 μm, or between 70-100 μm, or between 80-90 μm. The larger particle size between 70-120 μm shortens time necessary for fine grinding. The larger particle size may be used for the chocolate composition of the present invention without compromising the properties of the chocolate composition or the chocolate product.

The average particle diameter of the plant-based component and especially an oat component is less than 120 μm, or less than 100 μm, or between 20-120 μm, or between 60-120 μm, or between 70-100 μm, or between 80-90 μm.

Figure 11:
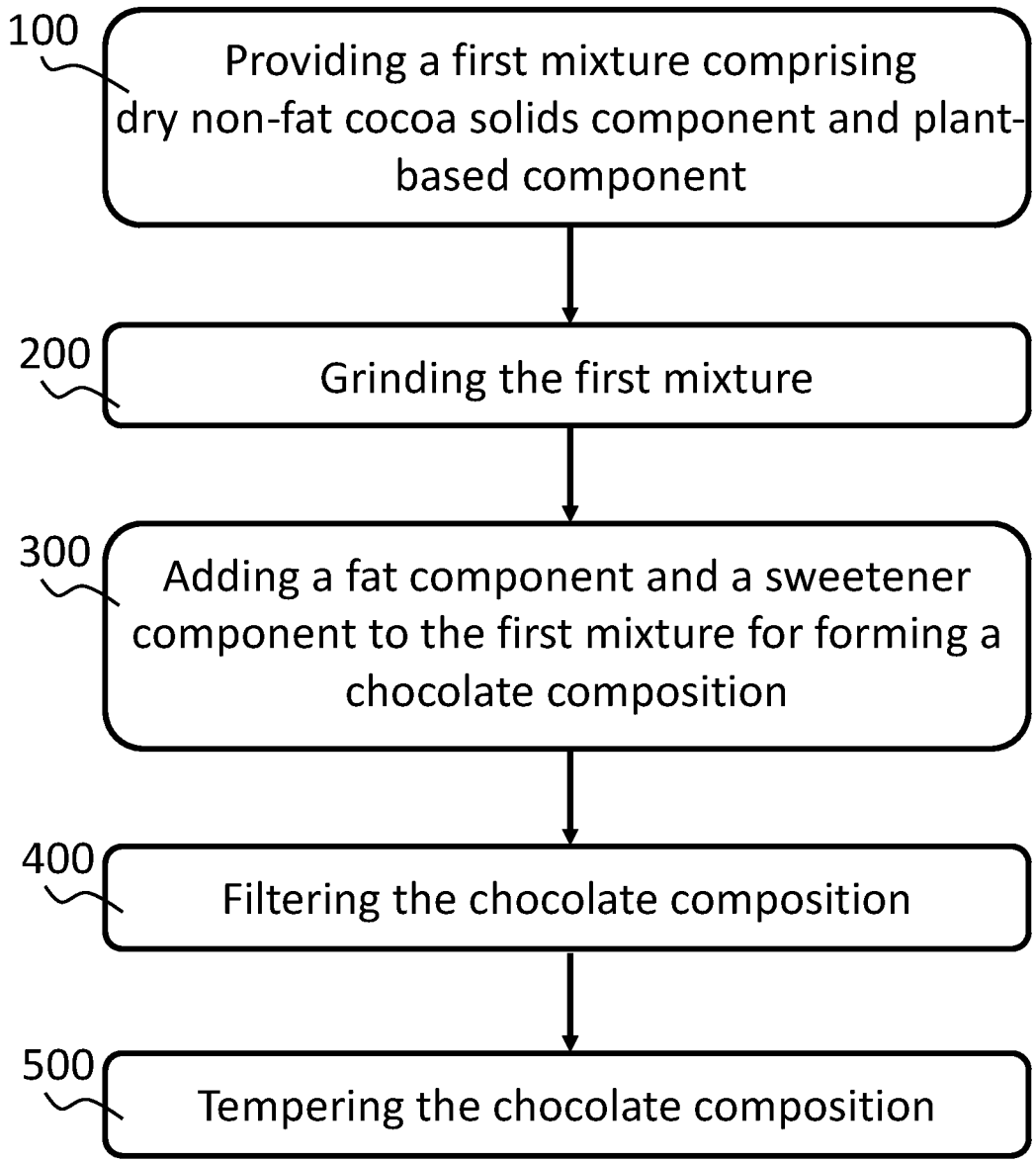
FIG. 11 shows another embodiment of the method according to the invention.

FIG. 11 shows one embodiment of the method according to the present invention in which after the step 300 or step 352 when the chocolate composition is fine grinded to desired characteristics, the chocolate composition may be filtered in step 400 for removing larger particles from the chocolate composition. The filtering step 400 may be arranged to remove for example particles having diameter larger than 120 μm, or 100 μm, or 90 μm.

After the filtering step 400, the filtered chocolate composition is tempered in step 500. In tempering step 500 the temperature of the chocolate composition is controlled in order to solidify the chocolate composition. Usually, the tempering comprises heating the chocolate composition to a desired temperature and then cooling the chocolate composition for producing a solid chocolate product. The chocolate composition may be arranged into a mould after the heating and the cooling is carried out in the mould.

Figure 12:
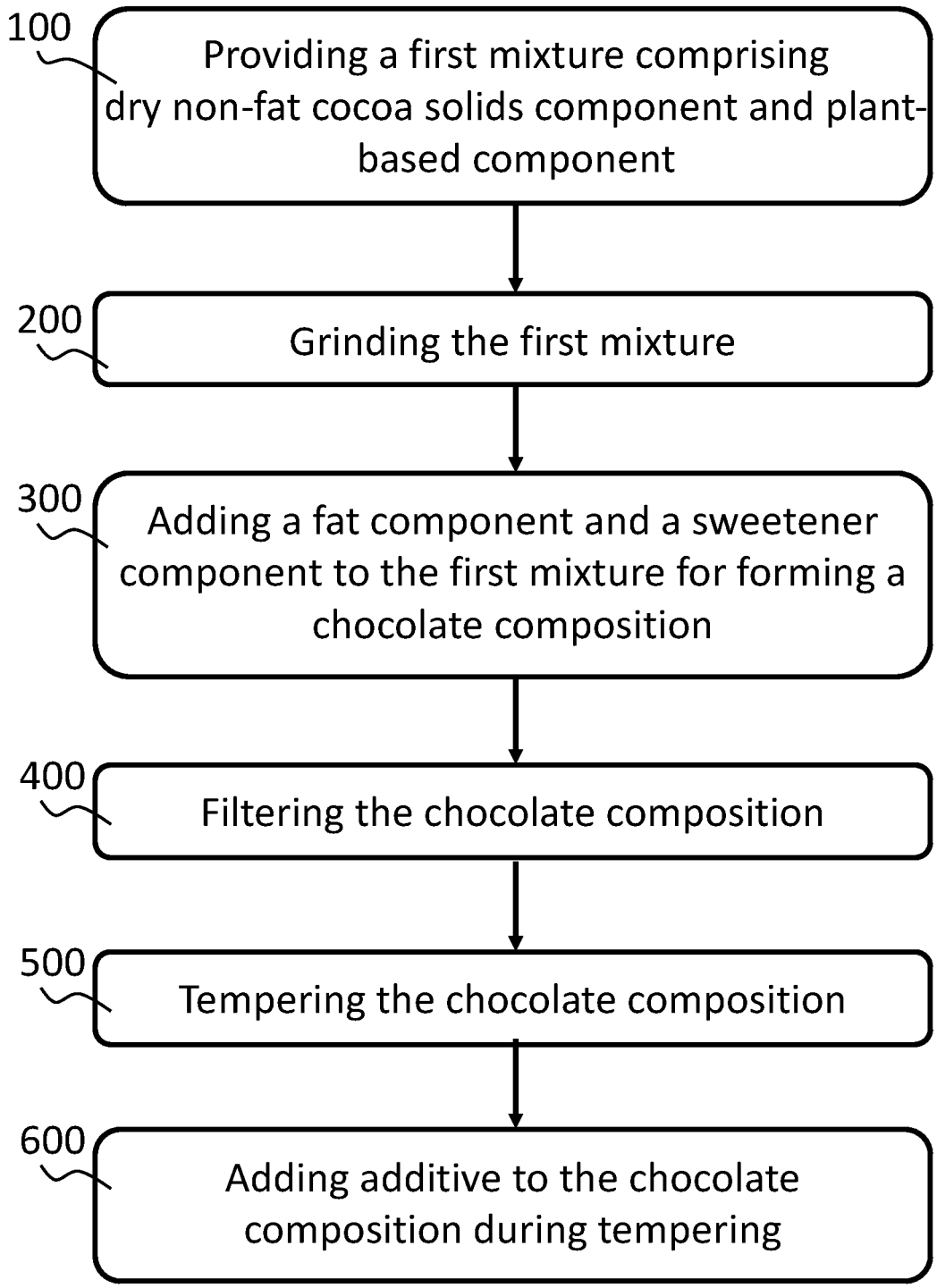
FIG. 12 shows still another embodiment of the method according to the invention.

As shown in FIG. 12, the method of the present invention may further comprise adding additives to the chocolate composition in step 600. The additives may be added to the chocolate composition during tempering, and preferably during heating of the chocolate composition in the tempering step 500. The additives may comprise for example flavouring additives.

The method of the present invention is preferably such that temperature of the dry non-fat cocoa solids component, plant-based component, the fat component and the sweetener component or the chocolate composition does not exceed 45° C. or 42° C. during the method. This enables producing a raw chocolate product.

In one embodiment of the method, the dry non-fat cocoa solids component comprises cocoa beans and/or cocoa nibs or the dry non-fat cocoa solids component comprises cocoa beans and/or cocoa nibs and the fat component comprises cocoa butter. In an alternative method, the dry non-fat cocoa solids component comprises cocoa beans and/or cocoa nibs, the fat component comprises cocoa butter, and the sweetener component comprises coconut palm sugar. Further alternatively, the dry non-fat cocoa solids component may comprise cocoa beans and/or cocoa nibs, the fat component may comprise cocoa butter and the plant-based component may comprise oat. In a yet alternative embodiment, the dry non-fat cocoa solids component comprises cocoa beans and/or cocoa nibs, the fat component comprises cocoa butter, the plant-based component comprises oat and the sweetener component comprise coconut palm sugar.

The method of the present invention may be utilized for producing a chocolate product containing dry cocoa solids content of 55% or less by weight. The chocolate product may comprise a dry non-fat cocoa solids component, a plant-based component, a fat component and a sweetener component. The plant-based component may form 18-25 w-% of the chocolate product and the sweetener component may form 20-32 w-% of the chocolate product.

It should be noted that the dry non-fat cocoa solids component, plant-based component, fat component and sweetener component may be any of the components disclosed earlier in the application. For example, and preferably, the plant-based component is an oat component.

Figure 13:
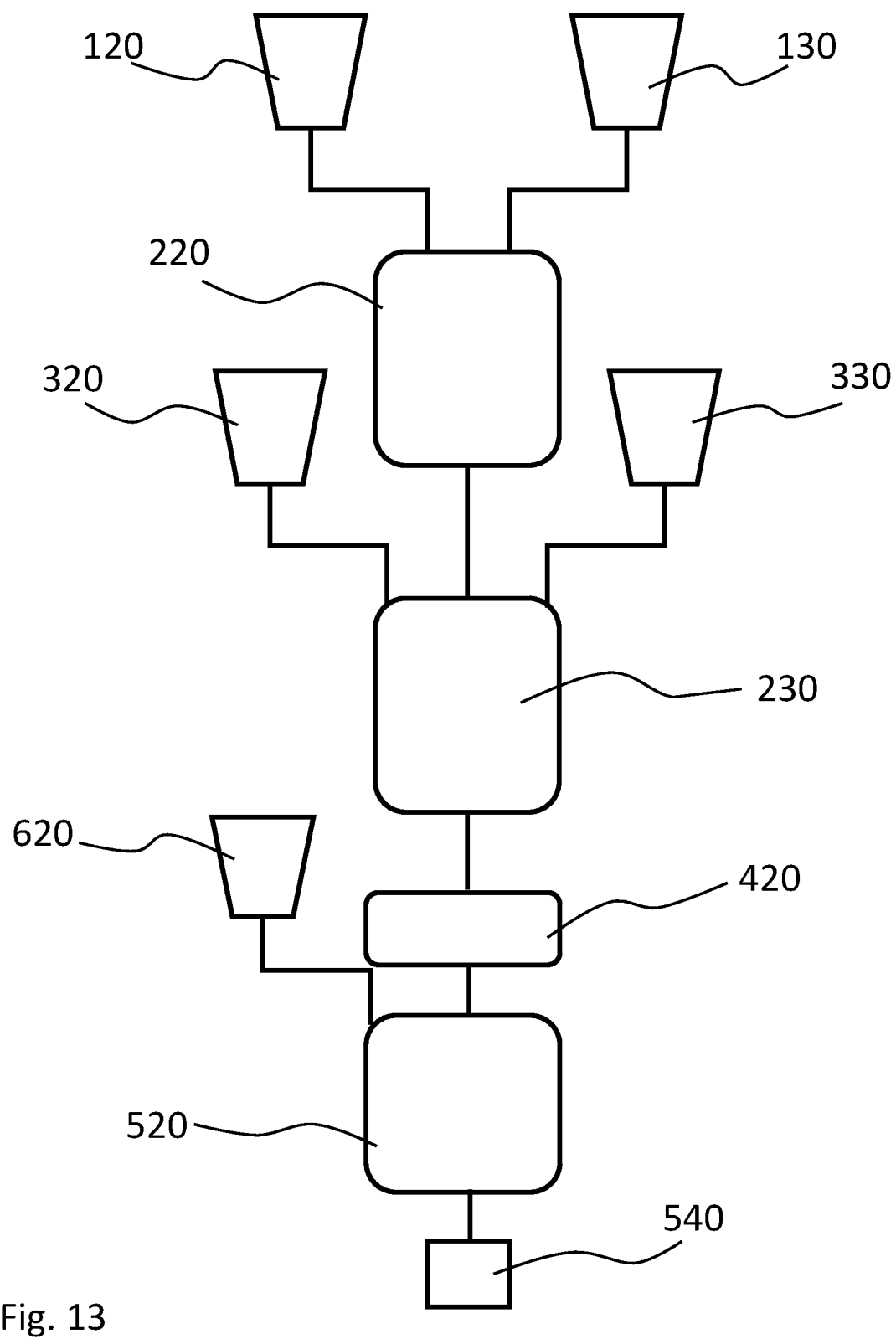
FIG. 13 shows one embodiment of an apparatus for carrying out the method of the present invention.

FIG. 13 shows one embodiment of an apparatus for carrying out the method of the present invention. The apparatus comprises a coarse grinding means 220, or coarse grinder, and a fine grinding means 230, or fine grinder. The apparatus may further comprise a filter 420 for filtering the chocolate composition and a tempering device 520 in which the chocolate composition heated. The apparatus may further comprise a moulding device 540 for dosing chocolate composition to moulds. The apparatus may also comprise a cooling device (not shown) into which the chocolate composition is arranged to cool after the heating and/or dosing into a mould.

The coarse grinder 220 and the fine grinder 230 may be known kind of grinding machines or milling machines. In one embodiment, the fine grinder 230 is ball mill.

The apparatus may comprise a first dosing device 120 arranged to dose the dry non-fat cocoa solids component, or a predetermined amount of the dry non-fat cocoa solids component, into the coarse grinder 220, and a second dosing device 130 arranged to dose the plant-based component, or a predetermined amount of the plant-based component, into the coarse grinder 220.

The apparatus may also comprise third dosing device 320 arranged to dose the fat component, or a predetermined amount of the fat component, into the fine grinder 230, and a fourth dosing device 330 arranged to dose the sweetener component, or a predetermined amount of the sweetener component, into the fine grinder 230.

Furthermore, the apparatus may also comprise at least one fifth dosing device 620 arranged to dose one or more additives, or a predetermined amount of at least one additive, into the tempering device 520.

It should be noted that the dosing devices 120, 130, 320, 330 and 620 may also be omitted. Furthermore, also the coarse grinder 220 may be omitted. Thus, it is also possible to arrange the first and second dosing devices 120, 13 in connection with the fine grinder 230.

The apparatus may be modified to correspond the embodiment of the method.

The present invention further relates to a chocolate composition containing dry cocoa solids content 55% or less by weight. According to the present invention, the chocolate composition comprises a dry non-fat cocoa solids component, a plant-based component, a fat component and a sweetener component. The plant-based component forms 18-25 w-% of the chocolate composition and the sweetener component forms 20-32 w-% of the chocolate composition.

The chocolate composition of the present invention may be produced by the method and apparatus as described above. However, the chocolate composition is not limited to the method and apparatus as described above, but the chocolate composition of the present invention could also be produced by any alternative method and apparatus.

Furthermore, the components as disclosed below, may be used in the above described method and apparatus for producing the chocolate composition. The components comprising the dry non-fat cocoa solids component, plant-based component, fat component and the sweetener component. The ratio of the components in the method may be the same as described below relating to the chocolate composition.

The chocolate composition contains dry cocoa solids content 55% or less by weigh and the dry cocoa solids content comprising the dry non-fat cocoa solids component, and a cocoa butter forming at least part of the fat component. The dry non-fat cocoa solids component and the cocoa butter may form together 35-55 w-% of the chocolate composition, or 40-55 w-% of the chocolate composition, or 45-55 w-% of the chocolate composition.

In one embodiment, the plant-based component comprises or is an oats component. The oats component may be provided in a form of oat flakes, oat meal, oat bran, oat groats or oat grains.

In one embodiment, the fat component comprises cocoa butter or is cocoa butter.

The sweetener component may comprise at least one of the following: coconut palm sugar, stevia, cane sugar, xylitol, syrup, maple sugar, palm sugar, coconut sugar.

The plant-based component or the oat component may form 20-24 w-% of the chocolate composition. Alternatively, the plant-based component or an oat component may form 20-24 w-% of the chocolate composition and the sweetener component may form 25-30 w-% of the chocolate composition.

In one embodiment chocolate composition comprises 50-55 w-% of dry non-fat cocoa solids component and cocoa butter, 18-25 w-% of the oats component and 20-32 w-% of the sweetener component.

The invention has been described above with reference to the examples shown in the figures. However, the invention is in no way restricted to the above examples but may vary within the scope of the claims.

The invention claimed is:

1. A method for producing chocolate composition having dry cocoa solids content of 55% or less by weight, wherein the method comprises:
   a first step of providing a first mixture, the first step comprises mixing a dry non-fat cocoa solids component and a plant-based component together for providing the first mixture, the plant-based component being an oats component;
a second step of grinding the first mixture; and
a third step of adding a fat component and a sweetener component to the first mixture for providing the chocolate composition in which the plant-based component being the oats component forming 18-25 w-% of the chocolate composition and the sweetener component forming 20-40 w-% of the chocolate composition.

2. The method according to claim 1, wherein the first step comprises:
coarse grinding the dry non-fat cocoa solids component; and
providing the first mixture comprising the coarse grinded dry non-fat cocoa solids component and the plant-based component being the oats component; or
coarse grinding the dry non-fat cocoa solids component;
coarse grinding the plant-based component being the oats component; and
providing the first mixture comprising the coarse grinded dry non-fat cocoa solids component and the coarse grinded plant-based component being the oats component; or
providing the first mixture comprising dry non-fat cocoa solids component and plant-based component being the oats component; and
coarse grinding the first mixture such that the dry non-fat cocoa solids component and plant-based component being the oats component are coarse grinded together for providing a coarse grinded first mixture comprising the coarse grinded dry non-fat cocoa solids component and the coarse grinded plant-based component being the oats component.

3. The method according to claim 1, wherein the second step comprises:
fine grinding the first mixture for providing a fine grinded first mixture; or
fine grinding the first mixture comprising the coarse grinded dry non-fat cocoa solids component and the plant-based component being the oats component for providing the fine grinded first mixture; or
fine grinding the first mixture comprising the coarse grinded dry non-fat cocoa solids component and the coarse grinded plant-based component being the oats component for providing the fine grinded first mixture; or
fine grinding the coarse grinded first mixture comprising the coarse grinded dry non-fat cocoa solids component and the coarse grinded plant-based component being the oats component for providing the fine grinded first mixture.

4. The method according to claim 1, wherein the third step comprises:
adding the fat component to the first mixture for providing a second mixture comprising the dry non-fat cocoa solids component, the plant-based component being the oats component and the fat component; or
adding the fat component to the first mixture during the fine grinding of the first mixture in the second step for providing a second mixture comprising the dry non-fat cocoa solids component, the plant-based component being the oats component and the fat component; or
adding the fat component to the first mixture after coarse grinding the cocoa solids component and/or the plant-based component being the oats component for providing a second mixture comprising the dry non-fat cocoa solids component, the plant-based component being the oats component and the fat component.

5. The method according to claim 4, wherein the third step further comprises:
adding the sweetener component to the second mixture for providing the chocolate composition; or
fine grinding the second mixture for providing a grinded second mixture; and
adding the sweetener component to the grinded second mixture for providing the chocolate composition; or
fine grinding the second mixture for providing a grinded second mixture;
adding the sweetener component to the grinded second mixture for providing the chocolate composition; and
fine grinding the chocolate composition; or
fine grinding the second mixture;
adding the sweetener component to the second mixture in two or more batches for providing the chocolate composition;
fine grinding the second mixture between adding the two or more batches of the sweetener component; and
fine grinding the chocolate composition.

6. The method according to claim 1, wherein the method further comprises:
providing the first mixture comprising the dry non-fat cocoa solids component and the plant-based component being the oats component;
coarse grinding the first mixture for providing the coarse grinded first mixture;
fine grinding the coarse grinded first mixture;
adding the fat component to the first mixture during the fine grinding of the first mixture for providing the second mixture;
fine grinding the second mixture;
adding sweetener component to the second mixture in two or more batches for providing the chocolate composition;
fine grinding the second mixture between the two or more batches of the sweetener component; and
fine grinding the chocolate composition.

7. The method according to claim 1, wherein the method further comprises:
filtering the chocolate composition; or
filtering the chocolate composition; and
tempering the chocolate composition.

8. The method according to claim 1, wherein:
temperature of the dry non-fat cocoa solids component, the plant-based component being the oats component, the fat component and the sweetener component does not exceed 45° C. during the method; or
temperature of the dry non-fat cocoa solids component, the plant-based component being the oats component, the fat component and the sweetener component does not exceed 42° C. during the method.

9. The method according to claim 1, wherein:
the dry non-fat cocoa solids component comprises cocoa beans and/or cocoa nibs; or
the dry non-fat cocoa solids component comprises cocoa beans and/or cocoa nibs and the fat component comprises cocoa butter; or
the dry non-fat cocoa solids component comprises cocoa beans and/or cocoa nibs, the fat component comprises cocoa butter, and the sweetener component comprises coconut palm sugar; or the dry non-fat cocoa solids component comprises cocoa beans and/or cocoa nibs, the fat component comprises cocoa butter and the plant-based component comprises oat; or the dry non-fat cocoa solids component comprises cocoa beans and/or cocoa nibs, the fat component comprises cocoa butter, the plant-based component comprises oat and the sweetener component comprise coconut palm sugar.

* * * * *